United States Patent
Zhang et al.

(10) Patent No.: US 12,487,116 B2
(45) Date of Patent: Dec. 2, 2025

(54) DEVICE FOR REMOTE ONLINE DETECTION OF ENVIRONMENTAL NOISE MONITORING SYSTEM

(71) Applicants: Zhejiang Province Institute of Metrology, Zhejiang (CN); Hangzhou Aihua Instruments Co., Ltd, Zhejiang (CN)

(72) Inventors: Zhikai Zhang, Zhejiang (CN); Shan He, Zhejiang (CN); Kaifan Zhang, Zhejiang (CN); Gaofeng Luo, Zhejiang (CN); Shuaijun Sang, Zhejiang (CN); Jing Zhang, Zhejiang (CN); Mingjun Cheng, Zhejiang (CN); Minghua Xiong, Zhejiang (CN); Delin Wu, Zhejiang (CN); Huanhuan Zhang, Zhejiang (CN); Jianmin Qiu, Zhejiang (CN); Yaozu Li, Zhejiang (CN); Shenping Gao, Zhejiang (CN); Xuezhen Kan, Zhejiang (CN)

(73) Assignees: Zhejiang Province Institute of Metrology, Hangzhou (CN); Hangzhou Aihua Instruments Co., Ltd, Hangzhou (CN)

( * ) Notice: Subject to any disclaimer, the term of this patent is extended or adjusted under 35 U.S.C. 154(b) by 120 days.

(21) Appl. No.: 18/431,524

(22) Filed: Feb. 2, 2024

(65) Prior Publication Data
US 2024/0280401 A1   Aug. 22, 2024

(30) Foreign Application Priority Data

Feb. 21, 2023 (CN) .......................... 202310181390.6

(51) Int. Cl.
*G01H 3/04* (2006.01)
*G01H 3/00* (2006.01)
(Continued)

(52) U.S. Cl.
CPC ............... *G01H 3/04* (2013.01); *G01H 3/005* (2013.01); *G01W 1/02* (2013.01); *G06V 20/52* (2022.01); *G01W 2203/00* (2013.01)

(58) Field of Classification Search
CPC .......... G01H 17/00; G01H 3/125; G01H 3/00; H04R 1/1083; H04R 29/00; G10L 25/51;
(Continued)

(56) References Cited

U.S. PATENT DOCUMENTS

2003/0204381 A1* 10/2003 Collier ..................... G01H 3/12
702/195

* cited by examiner

*Primary Examiner* — Kile O Blair
(74) *Attorney, Agent, or Firm* — MUNCY, GEISSLER, OLDS & LOWE, P.C.

(57) ABSTRACT

A device for remote online detection of an environmental noise monitoring system, comprising a control bus, and a meteorological monitoring module, a video monitoring module, a signal analyzing device, a platform communication port, an instrument communication port, a sinusoidal signal generation module, a tone burst generation module, an attenuator module and a power amplifier module respectively connected with the control bus; wherein the sinusoidal signal generation module and the tone burst generation module are respectively connected with a signal input end of the attenuator module; an output end of the attenuator module is connected with an input end of the power amplifier module; an output end of the power amplifier module is connected with a preamplifier adapter and an active comparison coupler, respectively.

8 Claims, 4 Drawing Sheets

(51) Int. Cl.
*G01W 1/02* (2006.01)
*G06V 20/52* (2022.01)
(58) Field of Classification Search
CPC ...... G10L 25/18; G10L 21/0208; G01W 1/02; G01W 2203/00
See application file for complete search history.

DEVICE FOR REMOTE ONLINE DETECTION OF ENVIRONMENTAL NOISE MONITORING SYSTEM

TECHNICAL FIELD

The disclosure relates to the technical field of environmental noise detection, in particular to a device for remote online detection of an environmental noise monitoring system.

BACKGROUND

At present, environmental noise has become the fourth largest pollution after waste gas, waste water and waste residue. There is serious noise pollution in some areas where high noise pollution occurs frequently in enterprises, in construction areas, near railways and airports, around the roads with a large number of motor vehicles and around a large number of high-rise buildings built in cities, which also has a great impact on people's production and life. With the continuous improvement of people's requirements for environmental protection, the complaints of environmental noise upsets are increasing year by year. At the same time, with the development of national economy and the improvement of people's material and cultural living standards, noise census and environmental protection work have been carried out in an all-round way, and noise is also regarded as one of the important quality indicators of products in machine manufacturing industry. At present, noise measuring instruments are not only used in acoustics and electroacoustics measurement, but also widely used in machine manufacturing, architectural design, transportation, environmental protection, medical and health care, national defense engineering and other fields, and become the necessary measuring instruments for almost all departments.

To ensure the accuracy of environmental noise, it is necessary to ensure the accuracy of the field instruments used to monitor noise, so it is necessary to detect the field noise monitoring system. At present, the commonly used detection methods of noise monitoring system include traditional periodic "off-line" laboratory detection method and "on-line" detection method.

The traditional periodic "off-line" laboratory detection method refers to disassembling the field noise monitoring system from the monitoring position within the specified time interval and transporting it to the laboratory standard device of the metrology department for performance detection, so as to determine the accuracy of the acoustic properties measured by the noise monitoring system. However, the limitations highlighted by this method are:

(1) Detection cannot be performed on schedule. The particularity of the application in an environmental monitoring system requires that the system cannot be stopped at will, as a result, the noise monitoring system can not be removed from the installation position on schedule and transported to the metrological technology organization for detection, thereby causing the detection cycle to fail to meet the relevant regulations.

(2) The system cannot be sent for inspection. Many environmental noise monitoring systems are bulky and integrate multiple monitoring functions, which generally cannot be disassembled after installation, resulting in the failure of normal inspection of instruments; in the event of a sudden public safety event, factors such as transportation interruption or failure of inspectors to travel normally will also affect the normal inspection of instruments.

(3) Disassembly and assembly are time-consuming, laborious and costly. In general, the field noise monitoring system is difficult, laborious and costly to disassemble and assembly due to field conditions.

In order to overcome the limitations of the "off-line" laboratory detection method, domestic technical institutions put forward the on-line detection method, which mainly uses a set of anechoic chamber free-field device for field detection, which can be used to detect the acoustic properties of the noise monitoring system. However, the limitations highlighted by this method are:

1) The device is inconvenient to transport. This set of device is large in volume and requires high sound insulation performance of materials;

2) The free-field performance of the device needs to be calibrated regularly, which is very inconvenient for daily use and reduces the detection efficiency;

3) In the process of on-line detection, the degree of human intervention is too high, and the detection is affected by various field environmental factors, which will make the detection results of the monitoring system produce large errors.

SUMMARY

In view of the above-mentioned shortcomings in the prior art, the present disclosure provides a device for remote online detection of an environmental noise monitoring system, which solves the problem that the existing on-line detection method requires disassembly of equipment and installation of an anechoic tube, making the detection difficult to perform.

In order to achieve the above objective, the technical solutions adopted by the present disclosure are:

a device for remote online detection of an environmental noise monitoring system is provided, which includes a control bus, and a meteorological monitoring module, a video monitoring module, a signal analyzing device, a platform communication port, an instrument communication port, a sinusoidal signal generation module, a tone burst generation module, an attenuator module and a power amplifier module respectively connected with the control bus;

the sinusoidal signal generation module and the tone burst generation module are respectively connected with a signal input end of the attenuator module; an output end of the attenuator module is connected with an input end of the power amplifier module; an output end of the power amplifier module is connected with a preamplifier adapter and an active comparison coupler, respectively;

the meteorological monitoring module is configured to acquire meteorological data (monitor area environmental meteorological parameters, such as wind speed, rainfall, wind direction, temperature, humidity, barometric pressure, etc., measure various meteorological parameters in real time and calibrate and correct microphone sensitivity of the detected environmental noise monitoring system so as to analyze the validity of monitoring data);

the video monitoring module is configured to acquire video data (the detected environment real-time video data of the detected environmental noise monitoring system includes the state of the detected instrument, the state of the standard device, the state of the personnel and the state of the surrounding environment, etc., and is used to ensure the real-time and reliability of the remote on-line detection, which is convenient for the remote control platform to carry out remote monitoring and timely control and deal with emergencies);

the signal analyzing device is connected with a standard microphone for acquiring standard microphone data;

the platform communication port is configured to perform external communication;

the instrument communication port is configured to be connected with the detected environmental noise monitoring system to obtain data of the detected environmental noise monitoring system;

the preamplifier adapter is configured to perform electrical property metrological parameter detection on the detected environmental noise monitoring system; and the active comparison coupler is configured to perform acoustic property detection of the detected environmental noise monitoring system by obtaining sound pressure level data of the detected environmental noise monitoring system through a coupler comparison test method.

Further, the electrical properties include level linearity, electrical signal frequency weighting, time weighting, tone burst response, repeated tone burst response, C-weighted peak sound level, statistical calculation, flat response and relative attenuation.

Further, the acoustic properties include indicated sound level calibration and sound signal frequency weighting.

Further, the platform communication port includes at least one of a 4G module, a 5G module, and a VPN module.

Further, the device further includes a remote management platform including a detection device connection control module connected with a platform communication port, and a test analysis module, an intercom module, a WEB service module, a database and a management module;

the management module includes a tester management unit, a detection device management unit, a detection record management unit and a tested instrument management unit; the management module is connected with the database;

the WEB service module is respectively connected with the tester management unit, the test analysis module and the intercom module; and the detection device connection control module is respectively connected with the test analysis module, the intercom module and the tested instrument management unit.

Beneficial effects of the present disclosure are: the present disclosure realizes functional diversification, volume miniaturization, carrying convenience of the detection device, does not need to disassemble the detected environmental noise monitoring system and arrange an anechoic chamber, and can quickly and effectively perform remote on-line detection on the metrological performance of the detected environmental noise monitoring system.

DETAILED DESCRIPTION

Specific embodiments of the present disclosure are described below to facilitate the understanding of the present disclosure by those skilled in the art, however, it should be clear that the present disclosure is not limited to the scope of the specific embodiments, and for those of ordinary skill in the art, as long as various changes are within the spirit and scope of the present disclosure as defined and determined by the appended claims, these changes are obvious, and all disclosures and creations that utilize the concept of the present disclosure are under protection.

Figure 1:
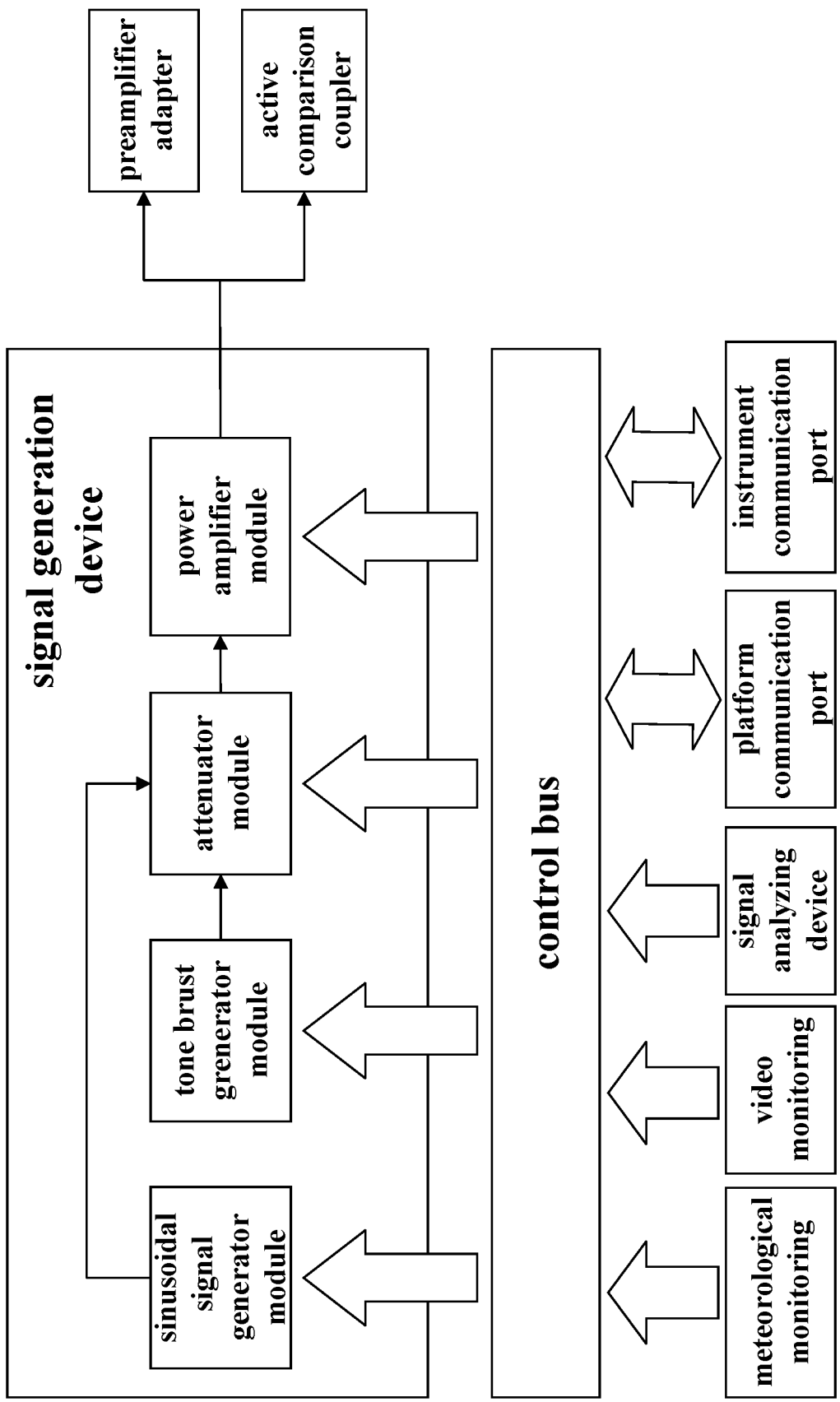
FIG. 1 is a schematic diagram of the present device.

As shown in FIG. 1, the device for remote online detection of an environmental noise monitoring system includes a control bus, and a meteorological monitoring module, a video monitoring module, a signal analyzing device, a platform communication port, an instrument communication port, a sinusoidal signal generation module, a tone burst generation module, an attenuator module and a power amplifier module respectively connected with the control bus; wherein the sinusoidal signal generation module and the tone burst generation module are respectively connected with a signal input end of the attenuator module; an output end of the attenuator module is connected with an input end of the power amplifier module; an output end of the power amplifier module is connected with a preamplifier adapter and an active comparison coupler, respectively;

the meteorological monitoring module is configured to acquire meteorological data (monitor area environmental meteorological parameters, such as wind speed, rainfall, wind direction, temperature, humidity, barometric pressure, etc., measure various meteorological parameters in real time and calibrate and correct microphone sensitivity of the detected environmental noise monitoring system so as to analyze the validity of monitoring data);

the video monitoring module is configured to acquire video data (the detected environment real-time video data of the detected environmental noise monitoring system includes the state of the detected instrument, the state of the standard device, the state of the personnel and the state of the surrounding environment, etc., and is used to ensure the real-time and reliability of the remote on-line detection, which is convenient for the remote control platform to carry out remote monitoring and timely control and deal with emergencies);

the signal analyzing device is connected with a standard microphone for acquiring standard microphone data;

the platform communication port is configured to perform external communication;

the instrument communication port is configured to be connected with the detected environmental noise monitoring system to obtain data of the detected environmental noise monitoring system;

the preamplifier adapter is configured to perform electrical property metrological parameter detection on the detected environmental noise monitoring system; and the active comparison coupler is configured to perform acoustic property detection of the detected environmental noise monitoring system by obtaining sound pressure level data of the detected environmental noise monitoring system through a coupler comparison test method.

Figure 4:
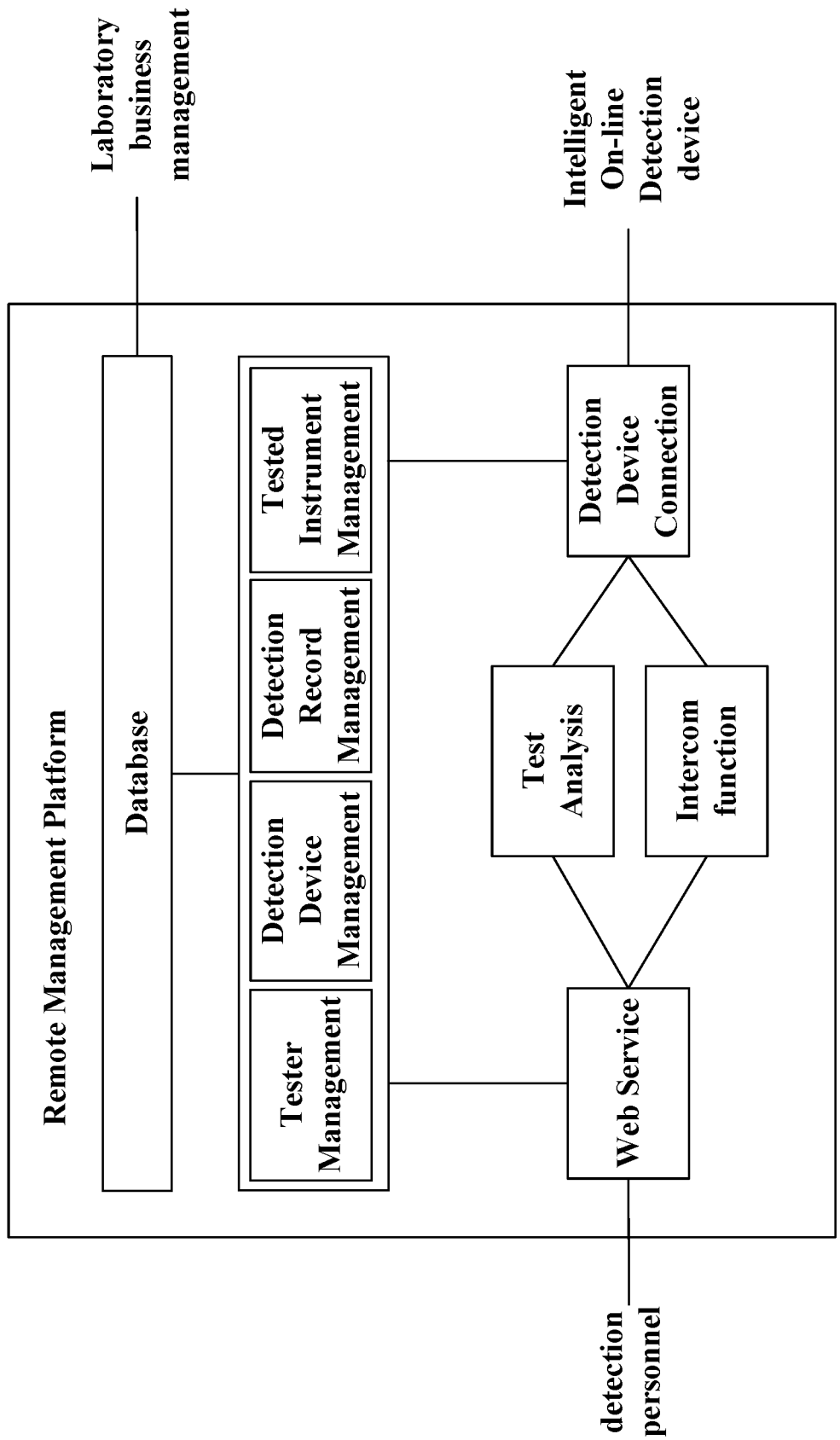
FIG. 4 is a structural diagram of a remote management platform.

As shown in FIG. 4, the device for remote online detection of an environmental noise monitoring system further includes a remote management platform including a detection device connection control module connected with a platform communication port, and a test analysis module, an intercom module, a WEB service module, a database and a management module;

the management module includes a tester management unit, a detection device management unit, a detection record management unit and a tested instrument management unit; the management module is connected with the database;

the WEB service module is respectively connected with the tester management unit, the test analysis module and the intercom module; and the detection device connection control module is respectively connected with the test analysis module, the intercom module and the tested instrument management unit.

Figure 2:
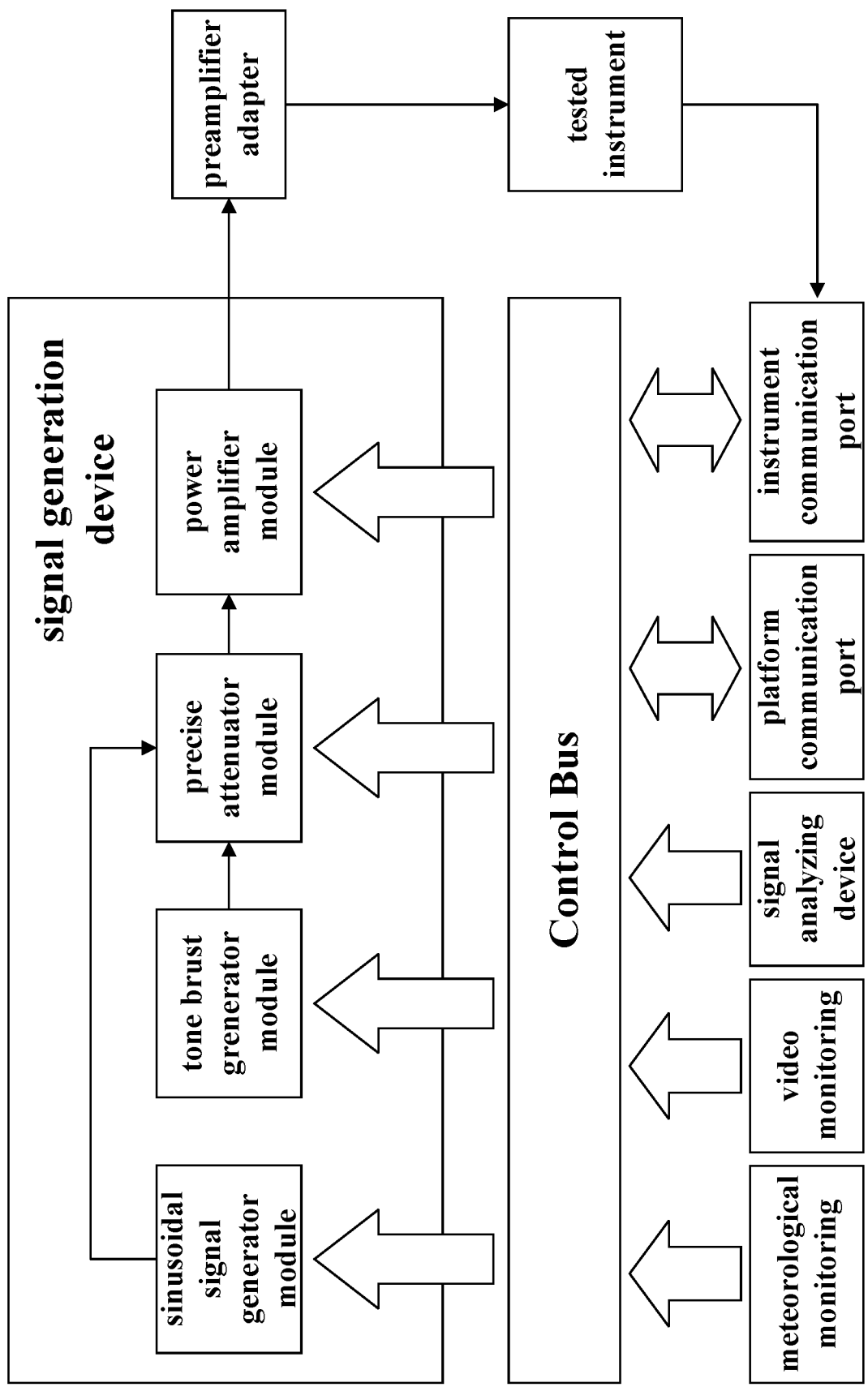
FIG. 2 is a schematic diagram of electrical property detection.
Figure 3:
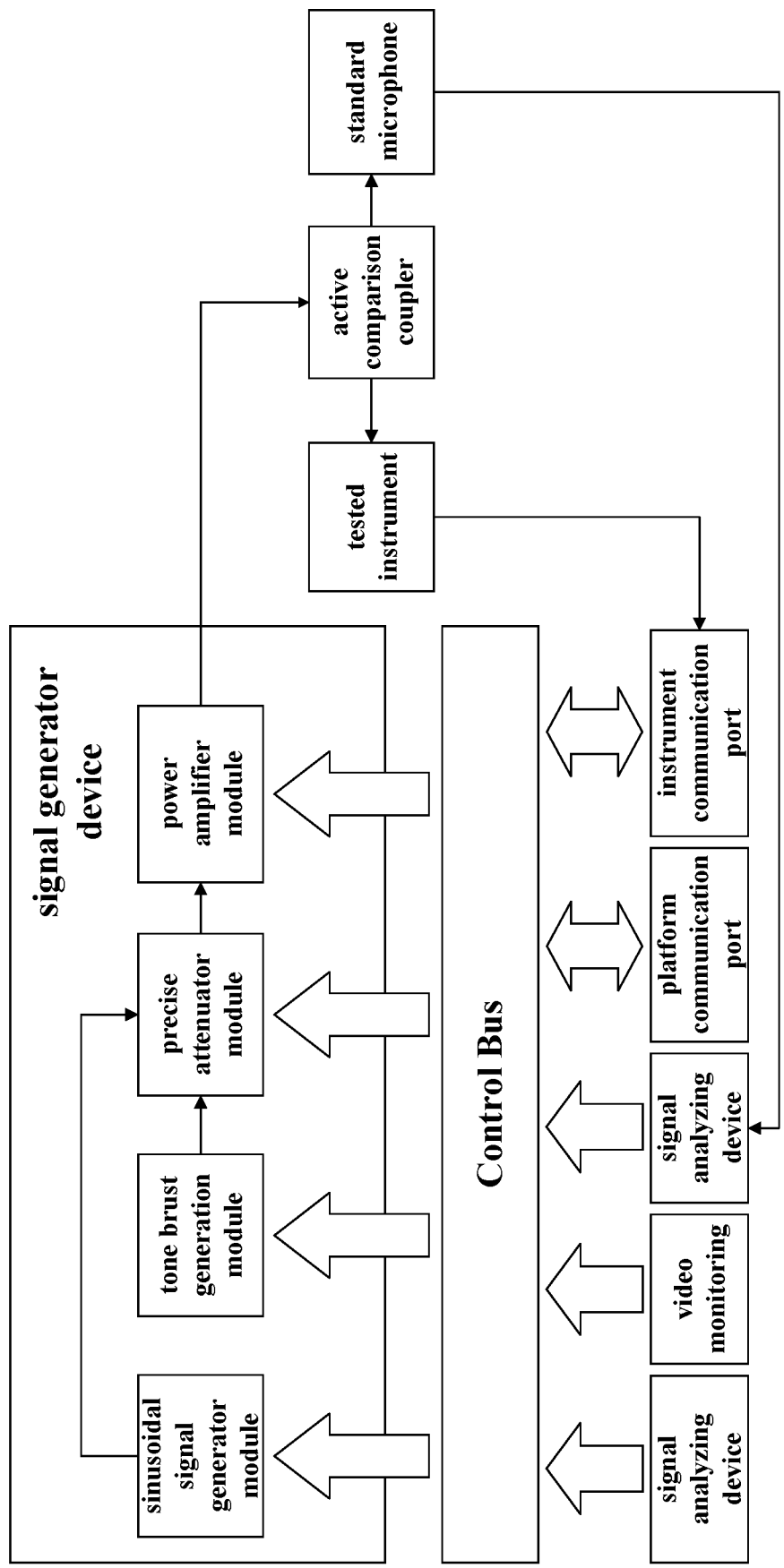
FIG. 3 is a schematic diagram of acoustic property detection.

In one embodiment, the device employs the synthetic instrument technology to connect individual modules and software through standardized interfaces to form a measurement device that uses the digital signal processing technology to generate signals for test measurements. The modules are uniformly controlled by a control bus, enabling the output of various signals, and the signal frequency, amplitude and type can be controlled. The device is connected with the detected noise instrument by a wired or wireless mode, performs data communication through the communication protocol of the tested instrument, writes the corresponding interface code so as to obtain the test data and carry out the metrological performance detection of the detected instrument. Functions of the detected instrument include noise integration, statistics and the filter function, etc. The metrological performance includes electrical properties (level linearity, electric signal frequency weighting, time weighting, tone burst response, repeated tone burst response, C-weighted peak sound level, statistical calculation, flat response, relative attenuation, etc.) and acoustic properties (an indicated sound level calibration and sound signal frequency weighting, etc.), and the detection schematic diagrams are FIGS. 2 and 3.

The device is configured to obtain the sound pressure level data of the detected environmental noise monitoring system through the coupler comparison test method while realizing the conventional electric property metrological parameter detection, thereby carrying out the acoustic property detection of the detected environmental noise monitoring system, reducing the requirements of the measuring equipment, and being able to quickly and accurately detect the metrological performance of the detected equipment.

In the detection process, the content of remote control and read data information needed for each detection can be listed, and then summarized, and a communication protocol of a control instruction and a test data information return instruction is designed. These two kinds of instructions need to contain various control factors and data factors that may be used, so that the remote management platform can carry out effective detection and analysis and get test results. A transmission instruction also needs to include various information verification processes, such as field personnel information verification (fingerprint recognition or face recognition) and intelligent detection device recognition.

In order to secure data transmission, the system will establish a system private network in the form of a 4G/5G VPN. In order to further improve the security of the data, encryption is also performed during the data transmission, and the encryption is performed using RSA public key encryption.

The remote management platform remotely controls the intelligent noise online detection device through software to perform performance (acoustic properties and electrical properties) detection of the detected instrument, is responsible for the storage and analysis of all data throughout the system, including tester information, tested instrument and detection device information, record information of detection procedures, etc. On the platform software, all the processes of each detection can be traced, and the docking interface with the laboratory business management system can be provided, and the detection data can be sent to the business management system to generate a detection certificate.

To sum up, the device obtains the detection data of the tested instrument in real time through the communication interface, and transmits the data to the remote management platform in real time through the Internet of Things technology (4G/5G) after the encryption process for analysis and processing. The running state of the equipment is detected online, and the video capture information is transmitted to the remote management platform for recording in real time. The disclosure realizes the function diversification, volume miniaturization and convenient carrying of the detection device, does not need to disassemble the detected environmental noise monitoring system and arranges the anechoic chamber, and can quickly and effectively carry out remote on-line detection on the metrological performance of the detected environmental noise monitoring system.

It will be apparent to those skilled in the art that the disclosure is not limited to the details of the above exemplary embodiments and that the disclosure can be embodied in other specific forms without departing from the spirit or essential features of the disclosure. Therefore, from any perspective, the examples are to be regarded as exemplary and not restrictive, and the scope of the present disclosure is defined by the appended claims rather than by the above description. Therefore, all variations falling within the meaning and scope of the equivalent elements of the claims are intended to be included in the present disclosure.

In addition, it should be understood that although this specification is described according to the embodiments, not each embodiment contains only one independent technical solution, the description in the specification is for clarity only, and those skilled in the art should take the specification as a whole, and the technical solutions in the examples can also be appropriately combined to form other embodiments that can be understood by those skilled in the art.

What is claimed is:

1. A device for remote online detection of an environmental noise monitoring system, comprising a control bus, and a meteorological monitoring module, a video monitoring module, a signal analyzing device, a platform communication port, an instrument communication port, a sinusoidal signal generation module, a tone burst generation module, an attenuator module and a power amplifier module respectively connected with the control bus; wherein the sinusoidal signal generation module and the tone burst generation module are respectively connected with a signal input end of the attenuator module; an output end of the attenuator module is connected with an input end of the power amplifier module; an output end of the power amplifier module is connected with a preamplifier adapter and an active comparison coupler, respectively;

the meteorological monitoring module is configured to acquire meteorological data, monitor area environmental meteorological parameters, measure various meteorological parameters in real time and calibrate and correct microphone sensitivity of the detected environmental noise monitoring system;

the video monitoring module is configured to acquire real-time video data of a detection environment of the detected environmental noise monitoring system;

the signal analyzing device is connected with a standard microphone for acquiring standard microphone data;

the platform communication port is configured to perform external communication;

the instrument communication port is configured to be connected with the detected environmental noise monitoring system to obtain data of the detected environmental noise monitoring system;

the preamplifier adapter is configured to perform electrical property metrological parameter detection on the detected environmental noise monitoring system; and the active comparison coupler is configured to perform acoustic property detection of the detected environmental noise monitoring system by obtaining sound pressure level data of the detected environmental noise monitoring system through a coupler comparison test method.

2. The device for remote online detection of an environmental noise monitoring system according to claim 1, wherein the electrical properties comprise level linearity, electrical signal frequency weighting, time weighting, tone burst response, repeated tone burst response, C-weighted peak sound level, statistical calculation, flat response and relative attenuation.

3. The device for remote online detection of an environmental noise monitoring system according to claim 2, further comprising a remote management platform comprising a detection device connection control module connected with a platform communication port, and a test analysis module, an intercom module, a WEB service module, a database and a management module; wherein the management module comprises a tester management unit, a detection device management unit, a detection record management unit and a tested instrument management unit; the management module is connected with the database;

the WEB service module is respectively connected with the tester management unit, the test analysis module and the intercom module; and the detection device connection control module is respectively connected with the test analysis module, the intercom module and the tested instrument management unit.

4. The device for remote online detection of an environmental noise monitoring system according to claim 1, wherein the acoustic properties comprise an indicated sound level calibration and sound signal frequency weighting.

5. The device for remote online detection of an environmental noise monitoring system according to claim 4, further comprising a remote management platform comprising a detection device connection control module connected with a platform communication port, and a test analysis module, an intercom module, a WEB service module, a database and a management module; wherein the management module comprises a tester management unit, a detection device management unit, a detection record management unit and a tested instrument management unit; the management module is connected with the database;

the WEB service module is respectively connected with the tester management unit, the test analysis module and the intercom module; and the detection device connection control module is respectively connected with the test analysis module, the intercom module and the tested instrument management unit.

6. The device for remote online detection of an environmental noise monitoring system according to claim 1, wherein the platform communication port comprises at least one of a 4G module, a 5G module, and a VPN module.

7. The device for remote online detection of an environmental noise monitoring system according to claim 6, further comprising a remote management platform comprising a detection device connection control module connected with a platform communication port, and a test analysis module, an intercom module, a WEB service module, a database and a management module; wherein the management module comprises a tester management unit, a detection device management unit, a detection record management unit and a tested instrument management unit; the management module is connected with the database;

the WEB service module is respectively connected with the tester management unit, the test analysis module and the intercom module; and the detection device connection control module is respectively connected with the test analysis module, the intercom module and the tested instrument management unit.

8. The device for remote online detection of an environmental noise monitoring system according to claim 1, further comprising a remote management platform comprising a detection device connection control module connected with a platform communication port, and a test analysis module, an intercom module, a WEB service module, a database and a management module; wherein the management module comprises a tester management unit, a detection device management unit, a detection record management unit and a tested instrument management unit; the management module is connected with the database;

the WEB service module is respectively connected with the tester management unit, the test analysis module and the intercom module; and the detection device connection control module is respectively connected with the test analysis module, the intercom module and the tested instrument management unit.

* * * * *